(12) United States Patent
Schorr et al.

(10) Patent No.: US 7,013,433 B1
(45) Date of Patent: Mar. 14, 2006

(54) SYSTEM AND METHOD FOR PROVIDING A DYNAMICALLY UPDATING LEGEND

(75) Inventors: Janet L. Schorr, Seattle, WA (US); Timothy J. Cullen, Seattle, WA (US); Mark Fredrick Iverson, Seattle, WA (US); Michael D. Mueller, Poulsbo, WA (US); William Holt, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 97 days.

(21) Appl. No.: 10/755,511

(22) Filed: Jan. 12, 2004

(51) Int. Cl.
 *G06F 17/00* (2006.01)
(52) U.S. Cl. .................. 715/825; 715/775; 345/440
(58) Field of Classification Search ........... 715/825, 715/775, 848, 849; 345/440, 636; 701/212
See application file for complete search history.

(56) References Cited

U.S. PATENT DOCUMENTS

| | | | | |
|---|---|---|---|---|
| 5,619,631 A | * | 4/1997 | Schott | 345/440 |
| 6,188,403 B1 | * | 2/2001 | Sacerdoti et al. | 715/764 |
| 2004/0061701 A1 | * | 4/2004 | Arquie et al. | 345/440 |

* cited by examiner

*Primary Examiner*—Richard Hjerpe
*Assistant Examiner*—Michelle K. Lay
(74) *Attorney, Agent, or Firm*—Perkins Coie LLP

(57) ABSTRACT

Generating a dynamic legend for a drawing developed by a diagramming software program. A drawing sheet module and legend module, logically-coupled to the drawing sheet module, are useful for generating and updating a dynamic legend. The legend module can support the addition of a legend to a drawing sheet. The legend module can also determine if legend symbols should be automatically added to the legend. If legend symbols are added to a drawing sheet, that addition can be automatically reflected in the dynamic legend. Symbols can be converted such that they may be reflected in a dynamic legend.

26 Claims, 10 Drawing Sheets

SYSTEM AND METHOD FOR PROVIDING A DYNAMICALLY UPDATING LEGEND

FIELD OF THE INVENTION

The present invention relates to a dynamically updating legend for use in an electronic document and specifically to generating and modifying a legend in a diagramming or similar software program that is dynamically-linked to symbols in the electronic document.

BACKGROUND OF THE INVENTION

Computer-generated electronic documents have become an integral part of day-to-day life for many people. The business world has grown increasingly dependent on these documents for exchanging information. One specific type of electronic document is generated by a diagramming computer software application. Diagramming applications, such as VISIO®, by Microsoft Corporation of Redmond, Wash., can be used to generate graphical images for block diagrams, brainstorming, business processes, charts and graphs, marketing diagrams, flowcharts, maps, organizational charts, project schedules, timelines, engineering, networking, and software and web design. These applications typically generate electronic documents that include one or more drawing sheets.

A powerful aspect of a diagramming application is that the application can be used to generate a great variety of drawing images. These images can be customized to present almost any type of information. In many cases, the information is conveyed in picture form, rather than in words. Although many symbols used to convey this information have an almost universal meaning, often a depiction will have symbols with unique meanings. To communicate to a viewer the meaning of these symbols, a depiction will often have a legend that defines the meaning of the symbols. The concept of a legend is not new. As an example, maps have used legends to define map symbols for almost as long as maps have been made.

One limitation in the current state of the art in depiction legends is that these legends are static. They define symbols on a picture based on a fixed version of that picture. To capture all of the symbols on a picture, a legend must be drawn after the picture is complete. Further revisions to the picture or placing a legend on a picture before the picture is complete may necessitate the legend being revised to accurately capture all of the symbols. Also, symbols that may have a consistent meaning from one picture to the next have to be manually entered into each occurrence of a legend defining that symbol. Also, additional information about a symbol, such as the number of times that symbol appears in the depiction, must be manually determined, entered, and updated as necessary.

What is needed is a computer-implemented method and system for automatically generating a dynamic legend for an electronic document. There is a further need in the art for automatically updating a document legend in response to revisions to the document.

SUMMARY OF THE INVENTION

The present invention provides a computer implemented method for automatically generating a dynamic legend where the method identifies legend symbols within an electronic document, adds the legend symbols to the dynamic legend, and also may present other information about the symbol, such as the number of occurrences of the symbol within the electronic document.

In one aspect of the present invention, a method is provided for creating a dynamic legend for an electronic document. This method includes the steps of adding a legend to the electronic document and determining if the electronic document includes one or more legend symbols. If one or more legend symbols are contained in the electronic document, then the method adds each legend symbol to the legend. This aspect may also convert symbols to legend symbols and determine the number of occurrences of a legend symbol on a page.

In another aspect, a computer-implemented method for updating a dynamic legend is provided. The method includes the steps of determining if a symbol placed in an electronic document is a legend symbol and determining if a legend contains the symbol. If so, the method includes increasing the value of a counter by one, where the counter indicates the number of occurrences of the symbol in the electronic document. This aspect may also convert symbols to legend symbols.

In yet another aspect, a system for creating and updating a legend is provided. The system includes a drawing sheet module and a legend module, logically coupled to the drawing sheet module, operable to generate the legend in response to an action and to add one or more legend symbols to the legend.

The aspects of the present invention may be more clearly understood and appreciated from a review of the following detailed description of the disclosed embodiments and by reference to the drawings and claims.

DETAILED DESCRIPTION OF THE EXEMPLARY EMBODIMENTS

Exemplary embodiments of the present invention support a system and method for automatically generating a dynamic legend for an electronic document The method allows for dynamically updating information presented in the legend and defining legend symbols.

Figure 1:
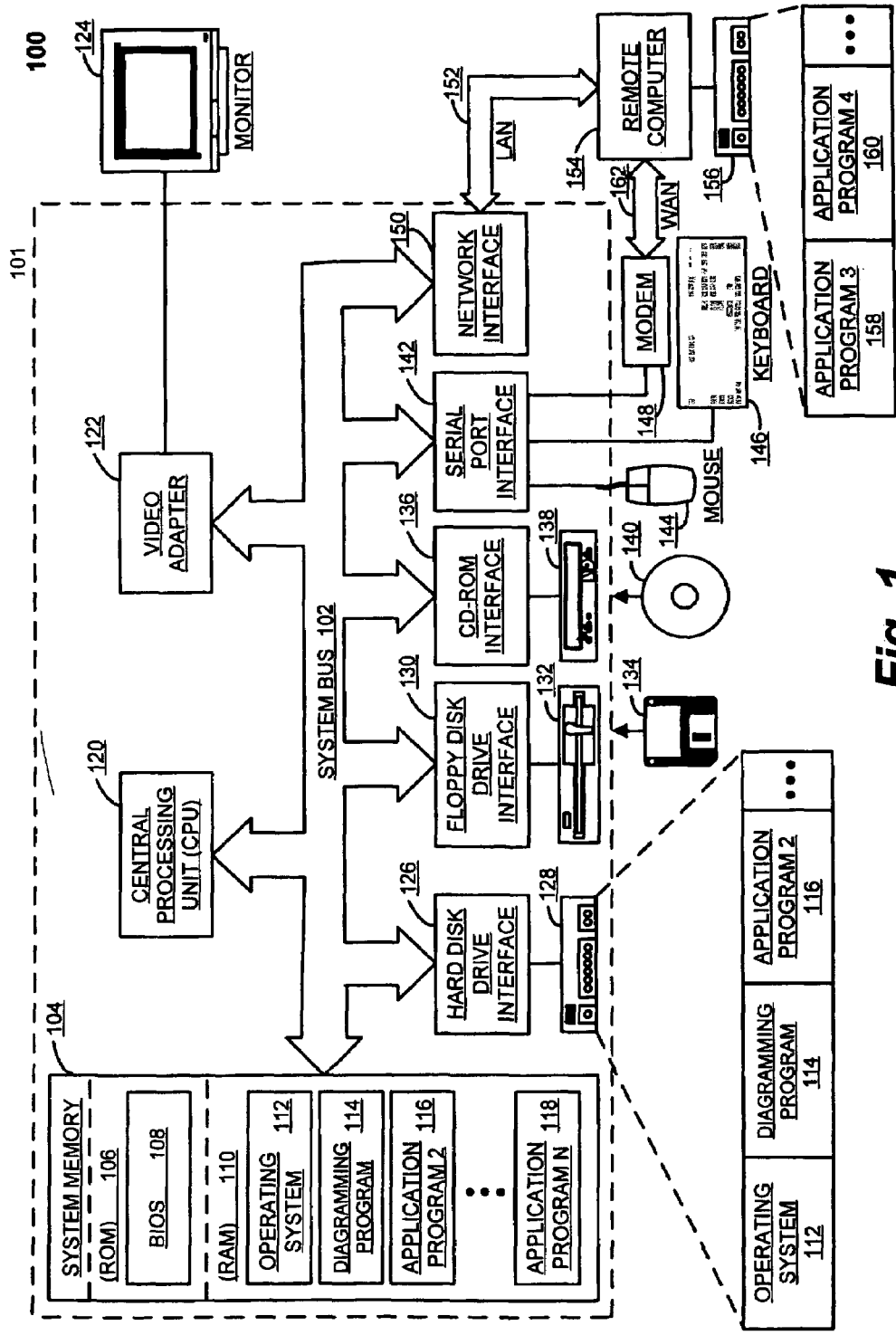
FIG. 1 is a block diagram illustrating a representative operating environment for an exemplary embodiment of the present invention.

FIG. 1 illustrates a representative operating environment 100 for an exemplary embodiment of the present invention. This representative operating environment includes a general-purpose computing device in the form of a conventional personal computer 101. Generally, the personal computer 101 includes a processing unit 120, a system memory 104, and a system bus 102 that couples system components including the system memory 104 to the processing unit 120. The system bus 102 may be any of several types of bus structures including a memory bus or memory controller, a peripheral bus, and a local bus using any bus architecture. The system memory includes a read-only memory (ROM) 106 and a random access memory (RAM) 110. A basic input/output system (BIOS) 108, containing the basic routines that help to transfer information between elements within personal computer 101, such as during start-up, is stored in ROM 106.

Personal computer 101 further includes a hard disk drive 128, a floppy disk drive 132 for reading from or writing to a removable magnetic disk 134, and an optical disk drive 138 for reading from or writing to a removable optical disk 140 such as a CD-ROM or other optical media. Hard disk drive 128, magnetic disk drive 132, and optical disk drive 138 are connected to system bus 102 by a hard disk drive interface 126, a floppy disk drive interface 130, and a CD-ROM disk drive interface 136, respectively. Although the exemplary environment described herein employs hard disk 128, removable magnetic disk 134, and removable optical disk 140, it should be appreciated by those skilled in the art that other types of computer readable media that can store data that is accessible by a computer, such as magnetic cassettes, flash memory cards, digital video disks, Bernoulli cartridges, RAMs, ROMs, and the like, may also be used in the exemplary operating environment. The drives and their associated computer-readable media provide nonvolatile storage of computer-executable instructions, data structures, program modules, and other data for personal computer 101.

A number of program modules may be stored on hard disk 128, magnetic disk 134, optical disk 140, ROM 106, or RAM 110, including an operating system 112, a diagramming program 114, and multiple application programs 116–118. A representative embodiment of a diagramming program is disclosed in more detail below in connection with FIG. 2. Program modules typically include routines, sub-routines, programs, objects, components, data structures, etc., that perform particular tasks or implement particular abstract data types. A diagramming program 114 may allow a user to generate diagrams used to communicate information. These diagrams may include process flow charts, maps, project schedules, floor plans, organization charts, or networks. One aspect common to many diagrams that may be generated using a diagramming program 114 in the context of the present invention is a legend. Legends act as a visual dictionary for diagrams, where symbols and their meaning are documented together on a diagram.

A user may enter commands and information into personal computer 101 through input devices, such as a keyboard 146 and a pointing device, such as mouse 144. Pointing devices may also include a trackball (not shown) and an electronic pen or stylus (not shown) that can be used in conjunction with an electronic tablet or a typical display screen. Other input devices (all not shown) may include a microphone, joystick, game pad, satellite dish, scanner, or the like. These and other input devices are often connected to processing unit 120 through a serial port interface 142 that is coupled to the system bus 102, but may be connected by other interfaces, such as a parallel port, game port, a universal serial bus (USB), or the like. A display device, such as monitor 124, may also be connected to system bus 102 via an interface, such as a video adapter 122. The monitor 124 may display images generated by an application program, such as a diagramming program 114, and include a graphical user interface by which a user can input information to the application program and the application program can communicate information to a user. In addition to the monitor 124, personal computers typically include other peripheral output devices (not shown), such as speakers and printers.

The personal computer 101 may operate in a networked environment using logical connections to one or more remote computers 154. Remote computer 154 may be another personal computer, a server, a client, a router, a network PC, a peer device, or other common network node. While a remote computer 154 typically includes many or all of the elements described above relative to the personal computer 101, only a memory storage device 156 has been illustrated in FIG. 1. The memory storage device 156 may include application program 158 and application program 160. The logical connections depicted in FIG. 1 include a local area network (LAN) 152 and a wide area network (WAN) 162. Such networking environments are commonplace in offices, enterprise-wide computer networks, intranets, and the Internet.

When used in a LAN networking environment, the personal computer 101 is often connected to the local area network 152 through a network interface or adapter 150. When used in a WAN networking environment, the personal computer 101 typically includes a modem 148 or other means for establishing communications over WAN 162, such as the Internet. Modem 148, which may be internal or external, is connected to system bus 102 via serial port interface 142. It will be appreciated that the network connections shown are exemplary and other means of establishing a communications link between the computers may be used.

Moreover, those skilled in the art will appreciate that the present invention may be implemented in other computer system configurations, including PDAs, electronic writing tablets, multiprocessor systems, microprocessor-based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
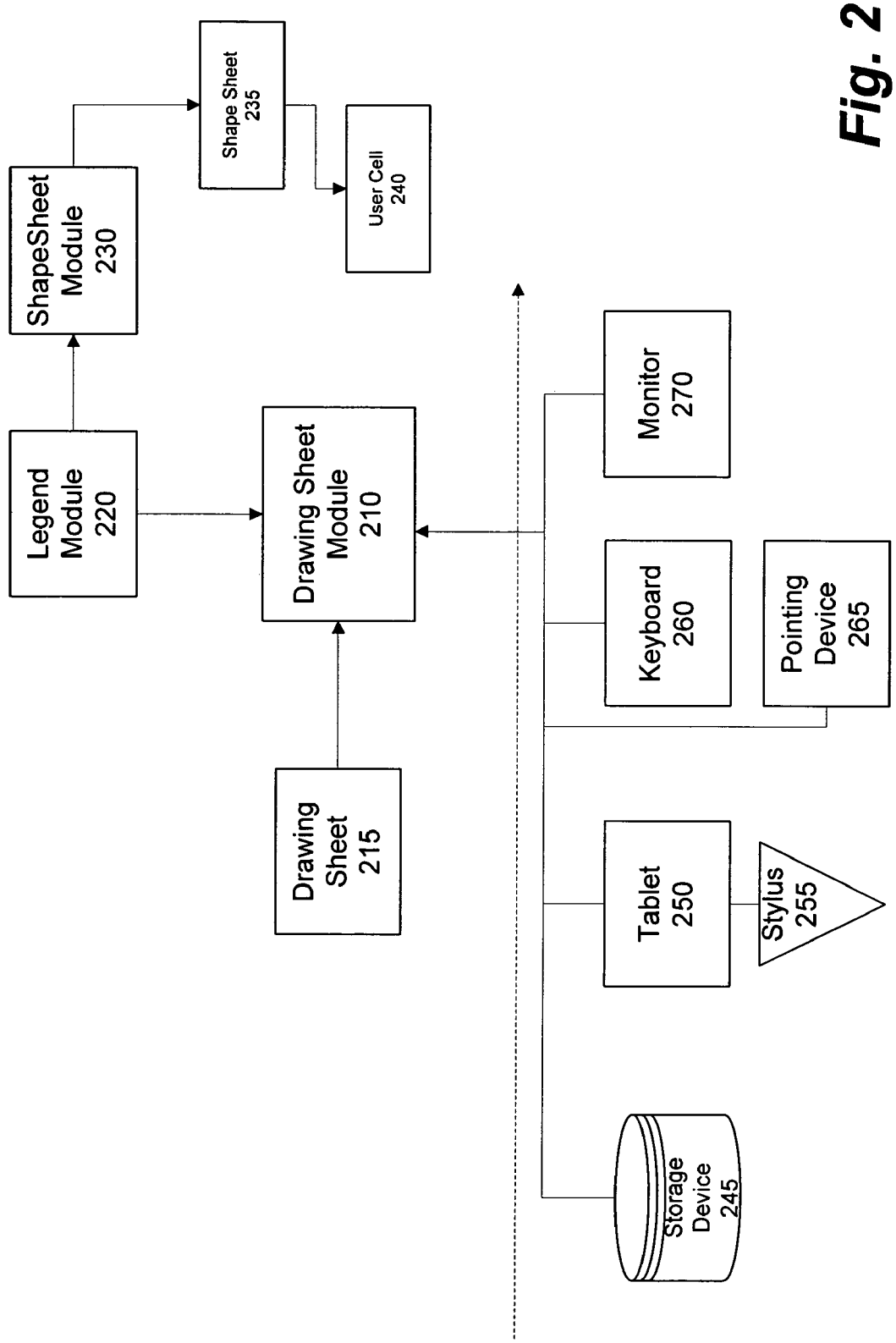
FIG. 2 is a block diagram depicting functional components of an exemplary diagramming program and related input devices.

FIG. 2 is a block diagram 200 depicting functional components of an exemplary diagramming program and related input devices. Referring to FIGS. 1 and 2, a drawing sheet module 210 is a component of a diagramming application 114. The drawing sheet module 210 interacts with a legend module 220 to generate and update a legend on an electronic drawing sheet 215. This interaction allows a user, through input devices such as a keyboard 260, a stylus 255, or a pointing device 265 and output devices such as a monitor 270 or tablet 250, to generate a diagram on the drawing sheet 215. An electronic file representing the drawing sheet 215 may be stored in a storage device 245.

The legend module 220 may rely on a shape sheet module 230, which may have access to a variety of specific shape files. A shape sheet 235 may exist for each shape, also referred to herein as a symbol, that may be used on a drawing sheet 215, that is, each symbol has its own shape sheet. The shape sheet 235 may contain characteristics of a specific shape or symbol. One such characteristic may be a designation of the shape as a legend shape, which may be denoted by the existence of a user cell 240 in the shape sheet 235. This designation may be made by the user or the diagramming program 114 (FIG. 1). Legend shapes, or symbols, can be any symbol that may be used on a diagram to represent information. The symbols may be images, a color, a fill pattern, or other indication that enables the symbol to communicate specific information to a viewer.

One skilled in the art will appreciate that FIG. 2 presents a limited representation of one exemplary diagramming program and that other configurations may be used. Also, one skilled in the art will appreciate that the exemplary diagramming program 114 may have additional modules to allow for other types of diagramming presentations. FIGS. 6 through 10 present exemplary display images associated with a drawing sheets 215 containing diagrams, legends, and legend symbols. These figures are discussed in detail below.

Figure 3:
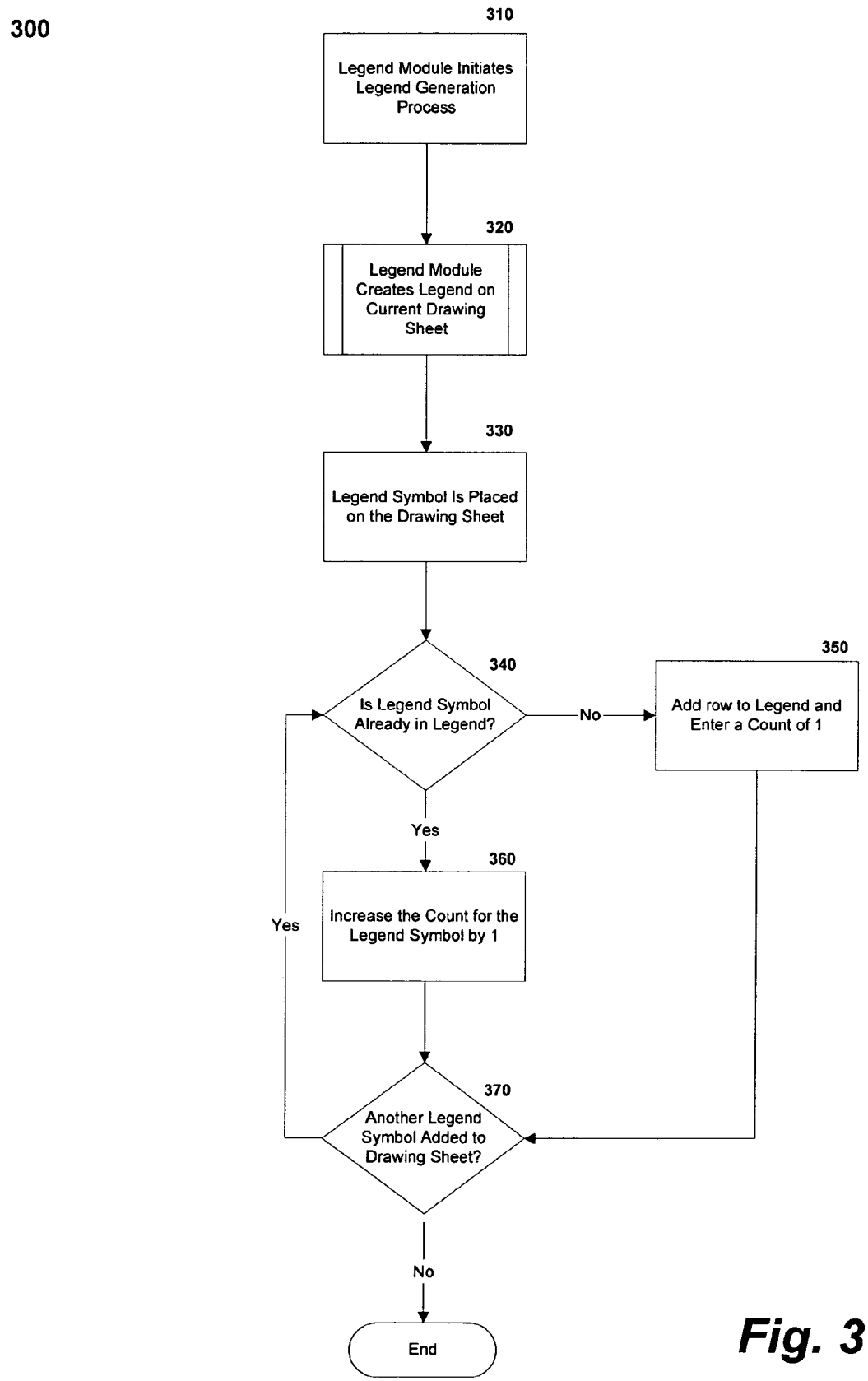
FIG. 3 is a flow diagram presenting a process for creating and dynamically-linking a legend to symbols in an electronic document in accordance with an exemplary embodiment of the present invention.

FIG. 3 is a flow diagram presenting a process 300 for creating and dynamically-linking a legend to symbols in an electronic document in accordance with an exemplary embodiment of the present invention. A dynamic legend may display both system- and user-defined symbols and reflect up-to-date information about each symbol, such as the number of occurrences of each symbol on a drawing sheet 215. Referring to FIGS. 2 and 3, at step 310, the legend module 220 initiates the legend generation process. This initiation may result from a user dragging an icon representing a legend shape onto a drawing sheet 215. Alternatively, this initiation step may be triggered by a user selecting an item from a menu or toolbar, such as with a pointing device 265, or through one or more keystrokes on a keyboard 260. In another alternative, step 310 may be automatically triggered by some action taken by a drawing sheet module 210, perhaps in response to some other user action.

At step 320, the legend module 220 creates a legend on a drawing sheet 215. In an alternative embodiment, a legend created for a drawing sheet 215 may be applied to each other drawing sheet 215 within an electronic document. Step 320 is discussed in greater detail below, in connection with FIG. 4.

At step 330, a legend symbol is placed on the drawing sheet 215. Step 330 may be accomplished by a user dragging a legend symbol onto the drawing sheet 215 and dropping the legend symbol onto the drawing sheet 215, perhaps by using a pointing device 265, such as a mouse. Alternatively, the legend symbol may be added to the drawing sheet 215 by selecting an item in a menu or through one or more keystrokes using a keyboard 260. For example, a user may drag a legend symbol such as "①" onto a drawing sheet 215 containing a floor plan diagram and into a representation on that drawing of a premium office. The shape sheet 235 for the legend symbol "①" may contain a user cell 240 to indicate that the symbol is a legend shape. Properties for the symbol may include a shape name which may be used by default as a descriptor in a legend for the symbol, such as a description as "Premium Office." See FIG. 7, discussed below, for an illustration.

At step 340, the process 300 determines if the legend symbol placed on the drawing sheet 215 at step 330 is already listed in the legend created at step 320. If the result at step 340 is "No," the process 300 moves to step 350. At step 350, a row is added to the legend created at step 320 and a count of one is entered for the symbol. The count indicates the number of occurrences of the specific legend symbol on the drawing sheet 215. In an alternative embodiment, the count may indicate the total number of occurrences of the specific symbol in the entire electronic document, that is, on multiple drawing sheets.

If the result at step 340 is "Yes," the process 300 moves to step 360. At step 360, the count for the legend symbol added to the drawing sheet 215 at step 330 is increased by one to indicate that one additional legend symbol of that type was added to the drawing sheet 215. In an alternative embodiment, a user may be able to indicate that a legend symbol added to a drawing sheet 215 is not serving as a legend symbol. In other words, a user may wish to add a symbol to a drawing sheet 215 that the legend module 220 would determine is defined as a legend symbol in a shape sheet 235 for that symbol, yet the user does not want that shape to be presented in the legend. In that case, this indication can be made and the symbol would not be added to the legend. This indication may be made by selecting an item in a menu or by responding to a query appearing on a graphical user interface generated by the legend module 220, such as a query asking the user if the symbol should be added to the legend.

At step 370, the process 300 determines if another legend symbol is added to the drawing sheet 215. If so, the process 300 returns to step 340 to repeat the process for adding legend symbols to a legend or adding to the legend symbol count. Otherwise, the process 300 ends. One skilled in the art would appreciate that, at step 370, the legend module 220 may constantly monitor for the addition of symbols to a drawing sheet 215 while the electronic file containing the drawing sheet 215 is open and that the legend module 220 may respond to the adding of a legend symbol to the drawing sheet 215 by returning to step 340. The process 300 may not end until the electronic file containing the drawing sheet 215 with the legend created at step 320 is closed.

The process 300 describes a process that includes dynamically updating a legend when a legend symbol is added to a drawing sheet 215. One skilled in the art would appreciate that a similar dynamic updating would occur if a legend symbol is removed from a drawing sheet 215. In this case, the count corresponding to the number of occurrences of the legend symbol on the drawing sheet 215 presented in the legend would be decreased by one for each occurrence of the legend symbol removed from the drawing sheet 215. If the last occurrence of the legend symbol is removed from the drawing sheet 215, then the row in the legend indicating that symbol may be removed.

Figure 4:
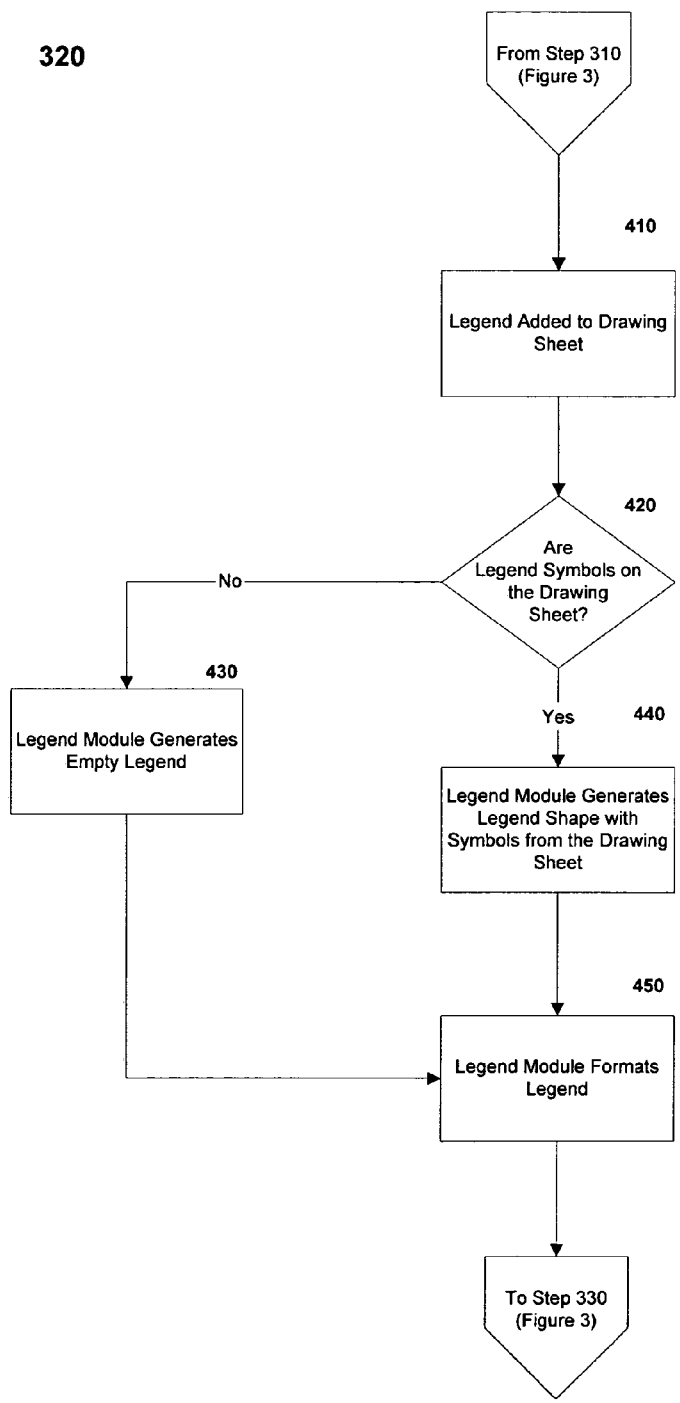
FIG. 4 is a flow diagram presenting a process for creating a legend that may be linked to symbols in an electronic document in accordance with an exemplary embodiment of the present invention.

FIG. 4 is a flow diagram presenting a process 320 for creating a legend that may be linked to symbols in an electronic document in accordance with an exemplary embodiment of the present invention. Referring to FIGS. 2, 3, and 4, at step 410, a legend shape is added to a drawing sheet. A legend shape can be a representation of a legend that, when placed onto the surface of a drawing sheet 215, triggers the legend module 220 to generate a legend. The legend shape may be contained in a collection of shapes, also referred to herein as a stencil, and this stencil may be within a separate window on a graphical user interface. The stencil may contain shapes that are related, such as flow chart shapes or timeline shapes. Step 410 may be accomplished by a user dragging a legend shape from a stencil onto the drawing sheet 215 and dropping the legend shape onto the drawing sheet 215 at a specific location, perhaps by using a pointing device 265, such as a mouse. Alternatively, the legend shape may be added to the drawing sheet 215 by selecting an item in a menu or through one or more keystrokes using a keyboard 260. One skilled in the art would appreciate that the process for generating a dynamic legend on a page could be triggered by actions other than placing a legend shape on a drawing sheet 215, such as by selecting an item in a menu or by depressing a button on a toolbar.

At step 420, the process 320 determines if legend symbols are present on the drawing sheet 215 to which the legend shape was added at step 410. If no legend symbols are present on the drawing sheet 215, then the process 320 moves to step 430 and the legend module 220 generates an empty legend, that is, a legend that contains no symbols. In an exemplary embodiment, the legend may present a message, such as the text "No symbols exist on the page to display." In an alternative embodiment, the legend module 220 may consider the entire electronic document containing the drawing sheet 215 when determining if legend symbols exist, that is, the legend may reflect all legend symbols in an electronic document even when that document includes multiple drawing sheets.

If legend symbols exist on the drawing sheet 215, the process 320 proceeds to step 440 and the legend module 220 generates a legend containing the symbols that exist on the drawing sheet 215. In other words, after a legend is added, the legend module compares the symbols on the drawing sheet 215 to each symbol's shape sheet 235. Any symbol on the drawing sheet 215 defined in its shape sheet 235 as a legend symbol, such as by containing a user cell 240 that identifies the symbol as a legend symbol, would be added to the legend. In an alternative embodiment, the legend may contain legend symbols contained in an entire electronic document containing the drawing sheet 215.

At step 450, the legend module 220 formats the legend. This step may be in response to a user selecting legend characteristics or by applying default settings. The formatting characteristics may include the type of information presented in the legend, such as a count of the number of occurrences of a legend symbol or the description of each legend symbol.

Figure 5:
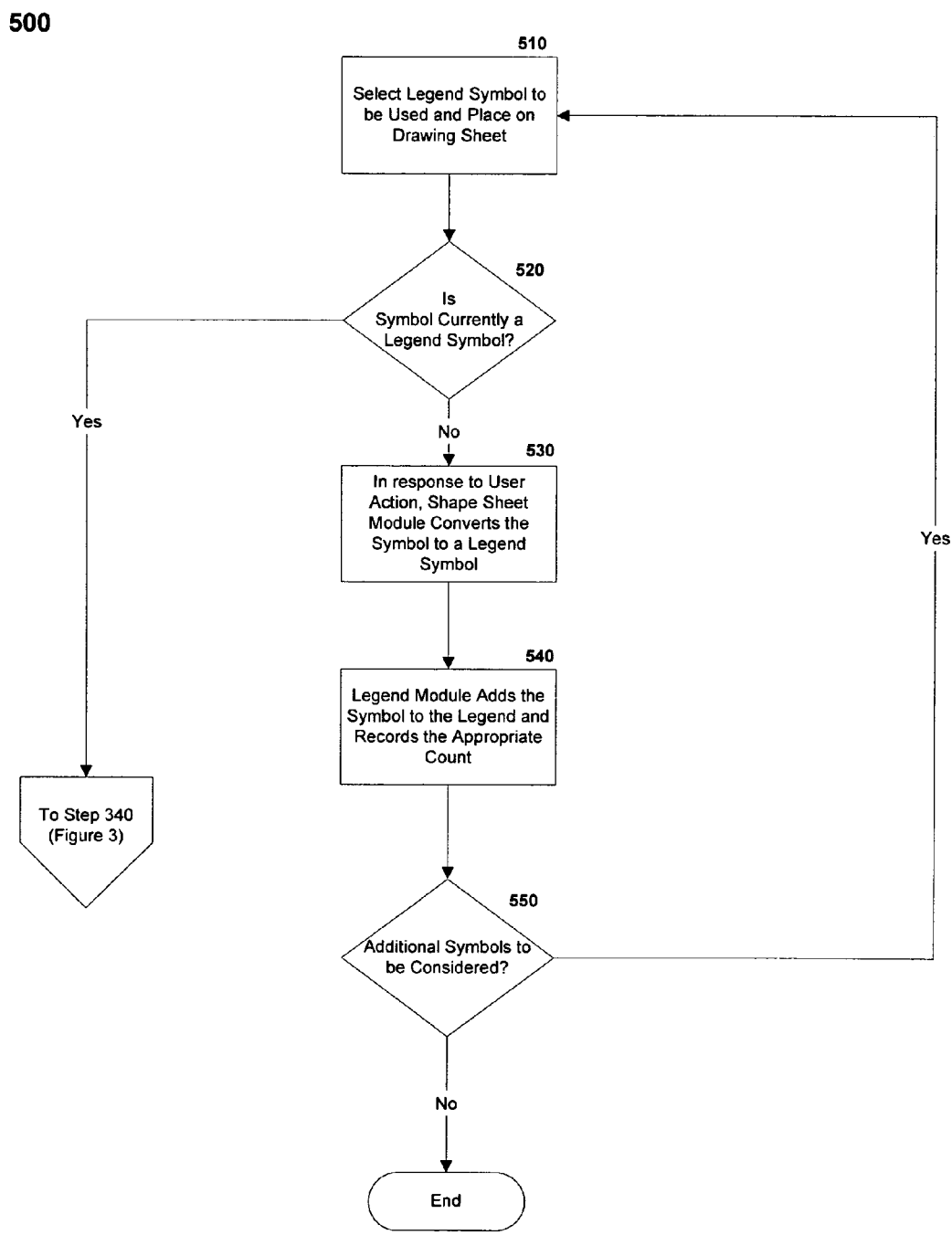
FIG. 5 is a flow diagram presenting a process for modifying and updating a dynamically-linked legend in accordance with an exemplary embodiment of the present invention.

FIG. 5 is a flow diagram presenting a process 500 for modifying and updating a dynamically-linked legend in accordance with an exemplary embodiment of the present invention. Referring to FIGS. 2, 3, and 5, at step 510, a symbol to be used on a drawing sheet 215 to represent a concept is selected and placed onto the drawing sheet 215. Step 510 may be accomplished by a user selecting a symbol, such as from a stencil or other collection of symbols, using a pointing device 265 or a keyboard 260, and placing the symbol onto the drawing sheet 215. For example, a user may modify an existing drawing sheet 215 contained in an electronic file, where the drawing sheet 215 includes a legend. The user may add a symbol to the drawing sheet 215 to communicate a concept. This symbol may not be designated in its shape sheet 235 as being a legend symbol, that is, its shape sheet 235 may not include a user cell 240. Alternatively, a symbol already on the drawing sheet 215 could be selected to be converted into a legend symbol shape. For example, a user may have placed symbols on a drawing sheet 215 that are not legend symbols. The user may later decide to use these symbols in a legend.

At step 520, the legend module 220 determines if the symbol selected in step 510 is currently a legend symbol, that is, whether the shape sheet 235 for that symbol indicates that the symbol is a legend symbol, such as by containing a user cell 240. If the result at step 520 is "No," that is, the symbol is not currently designated as a legend symbol, the shape sheet module 230, at step 530, converts the symbol to a legend symbol by adding a user cell 240 to the shape sheet 235 corresponding to that symbol. This conversion may be initiated by a user action. For example, an icon representing the symbol could be dragged to and dropped on the legend on the drawing sheet 215, triggering the conversion to a legend shape. Alternatively, a user may use a pointing device 265, such as a mouse, to make the selection, such as by pointing to and clicking on the symbol to cause a menu to appear and selecting an item from that menu to convert the symbol to a legend symbol.

At step 540, the legend module 220 adds the symbol to the legend and records the appropriate count for the symbol. For a symbol initially added to a drawing sheet 215 at step 510, this count would be one. For the alternative where one or more occurrences of the symbol may already exist on the drawing sheet 215 prior to selecting the symbol to be converted to a legend symbol, then the count may be greater than one. Also, in an alternative embodiment, the count may reflect the total number of occurrences within an entire electronic document containing the drawing sheet 215. After step 540, the process 500 moves to step 550 and waits for an additional selection of a symbol to be added to the page.

Once no more symbols are to be converted to legend symbols, the process 500 ends. This ending may occur when the electronic file containing the drawing sheet 215 is closed. In this exemplary embodiment, the converted symbol is a legend symbol for the specific drawing sheet 215 only. To permanently convert the symbol to a legend symbol, the shape sheet 235 would be edited. Alternatively, the conversion by process 500 could apply to future drawing sheets 215, that is, the symbols could be permanent categorized as legend symbols by the shape sheet 235. Additionally, the conversion of a symbol to a legend symbol could apply to all drawing sheets in the electronic file containing drawing sheet 215.

If the result at step 520 is "Yes," that is, the symbol is already designated as a legend symbol in its shape sheet 235, then the process 500 moves to step 340 of process 300. As discussed above, process 300 covers adding a legend symbol to a drawing sheet 215.

FIGS. 6 through 10 present exemplary results seen in graphical user interface images by applying the processes of FIGS. 3, 4, and 5, discussed above. These images relate to a office floor plan created by a diagramming software program 114 (FIG. 1). One skilled in the art would appreciate that a dynamic legend can apply to any type of drawing developed by a diagramming software program 114 (FIG. 1) and that the office floor plan diagrams of FIGS. 6 through 10 are provided for illustrative purposes only.

Figure 6:
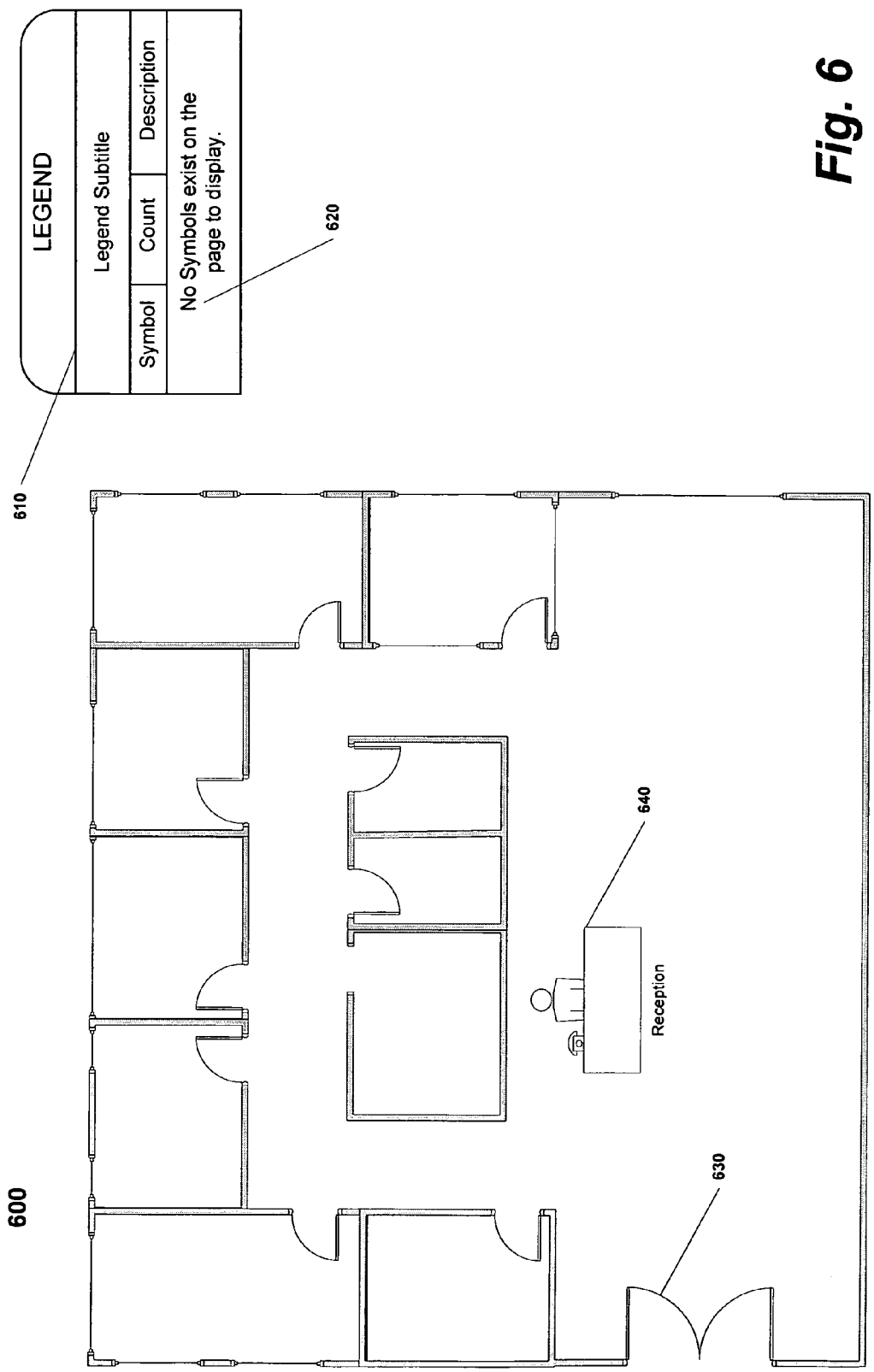
FIG. 6 depicts an image from a diagramming software program that contains a dynamically-linked legend in accordance with an exemplary embodiment of the present invention.

FIG. 6 depicts an image 600 generated from a diagramming software program 114 (FIG. 1), where the image 600 contains a dynamically-linked legend 610 in accordance with an exemplary embodiment of the present invention.

Referring to FIGS. 2 and 6, image 600 depicts an image of an office floor plan. The image includes the legend 610. This legend may present symbols used on a drawing sheet 215, along with the number of occurrences of that symbol and a description. In the case of the image 600, no symbols exist on the drawing sheet 215. As such, the legend 610 displays text 620, reading "No Symbols exist on the page to display."

The image 600 may include other symbols, such as the symbol for a door 630 or a reception area 640. However, the legend 610 displays only those symbols categorized as legend symbols, that is, symbols that the legend module 220 or user intend to display in a legend. The non-legend symbols 630, 640 are not displayed in legend 610. Process 500 (FIG. 5) could be applied to convert either or both of these symbols to legend symbols.

Figure 7:
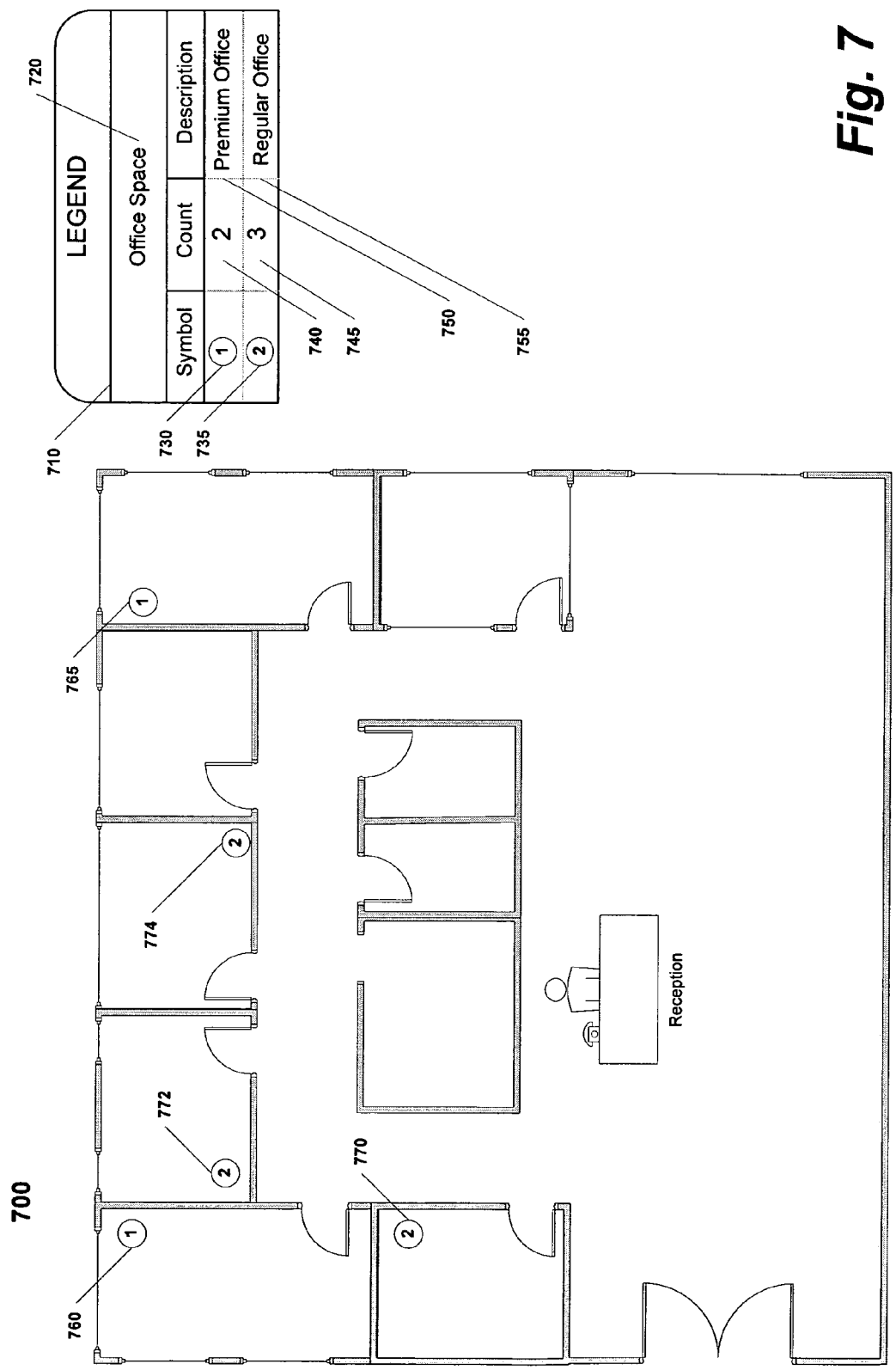
FIG. 7 depicts an image showing symbols added to an electronic document where the symbols are dynamically-linked to a legend in accordance with an exemplary embodiment of the present invention.

FIG. 7 depicts an image 700 showing symbols added to drawing sheet 215 where the symbols are dynamically-linked to a legend 710 in accordance with an exemplary embodiment of the present invention. Referring to FIGS. 2 and 7, the legend 710 presents a count and description of legend symbols that appear on the image 700. The legend 710 includes a subtitle 720, "Office Space," to further define the legend 710. The legend 710 also presents a symbol 730, "①," and a symbol 735, "②." The legend 710 also includes the number of occurrences, or count, for the symbol 730 and a symbol 735, count 740 and count 745. The legend also includes a description 750, "Premium Office," and a description 755, "Regular Office," for the symbol 730 and a symbol 735, respectively. These descriptions may be the symbol name, which is a property of the symbol. The descriptions in legend 710 may be edited, that is, the default descriptions may be overwritten.

The value for count 740 appearing in the legend 710 is "2," corresponding to the two occurrences 760, 765. The value for count 745 appearing in the legend 710 is "3," corresponding to the three occurrences 770, 772, 774. The image 700 may represent an image seen through a graphical user interface after a user has added the two occurrences 760, 765 of symbol 730 and the three occurrences 770, 772, 774 of symbol 735. In one case, the symbol 730 and the symbol 740 may have been designated, either by a user or the legend module 220, as a legend symbol in each shape's shape sheet 235 prior to opening the drawing sheet 215 depicted in image 700, such as each shape sheet 235 containing a user cell 240. In an alternative case, the symbol 730 and the symbol 740 may have been converted to legend symbols, such as by process 500 (FIG. 5).

Figure 8:
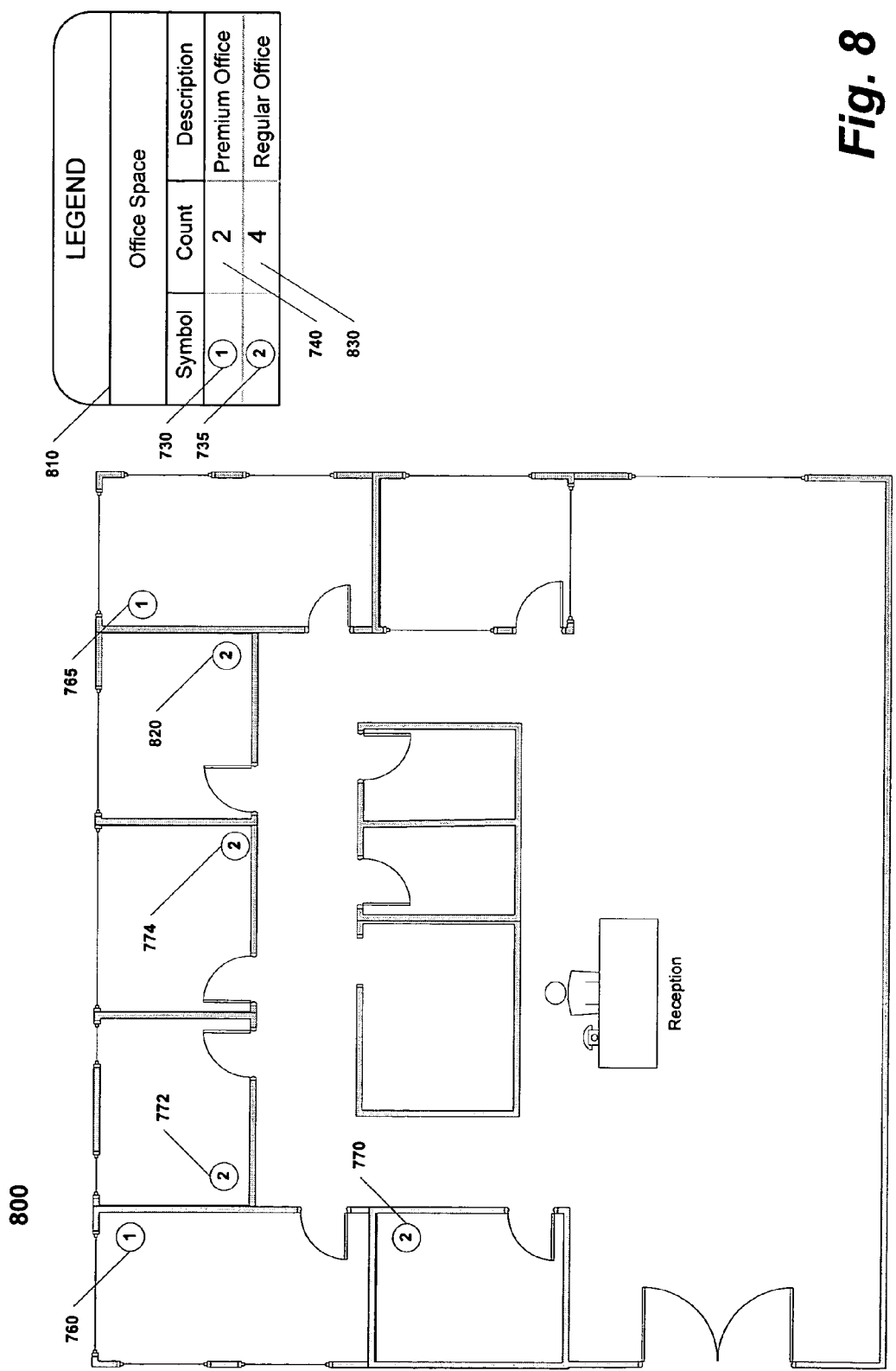
FIG. 8 is an image depicting a legend count being updated when a symbol is added to an electronic document where the symbol is dynamically-linked to the legend in accordance with an exemplary embodiment of the present invention.

FIG. 8 is an image 800 depicting a legend count being updated when a symbol is added to drawing sheet 215 where the symbol is dynamically-linked to a legend 810 in accordance with an exemplary embodiment of the present invention. Referring to FIGS. 2, 7, and 8, the image 800 displays an image similar to image 700. However, image 800 depicts the addition of the occurrence 820 of symbol 735. Following this addition, the value for count 740 appearing in the legend 810 remains "2," corresponding to the two occurrences 760, 765 seen in both image 700 and image 800. The value for count 830 appearing in the legend 810 is "4," corresponding to the four occurrences 770, 772, 774, 820 and reflecting the addition of occurrence 820 in image 800 as compared to image 700.

Figure 9:
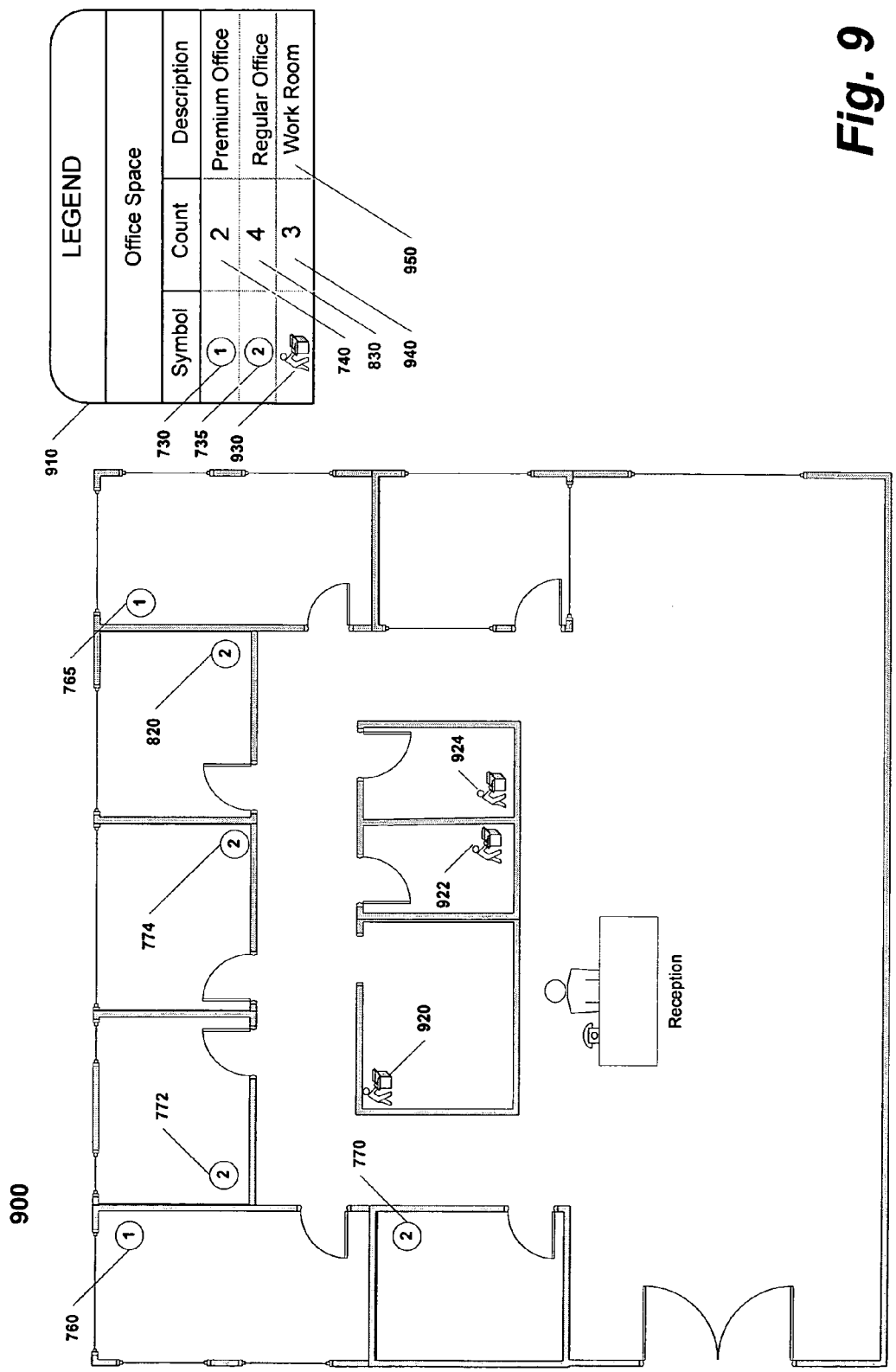
FIG. 9 is an image depicting a legend list being updated when a new symbol is added to an electronic document where the symbol is dynamically-linked to the legend in accordance with an exemplary embodiment of the present invention.

FIG. 9 is an image 900 depicting a legend list being updated when a new symbol 930 is added to a drawing sheet 215, where the symbol is dynamically-linked to a legend 910 in accordance with an exemplary embodiment of the present invention. Referring to FIGS. 2, 8, and 9, the legend 910 includes three symbols, with the symbol 930, added to the legend 910 as compared to the legend 810 of image 800. This change may reflect step 350 (FIG. 3), where a row is added to a legend when a legend symbol is added to a drawing sheet 215 and that row includes the symbol and other information about the symbol, such as a count or description. A count 940 presents a value of "3," corresponding to the three occurrences 920, 922, 924 of symbol 930. A description 950, "Work Room" is also reflected in legend 910 for symbol 930. The description 950 may be automatically added to the legend 910, based on the name of the symbol contained in the properties for that symbol.

Figure 10:
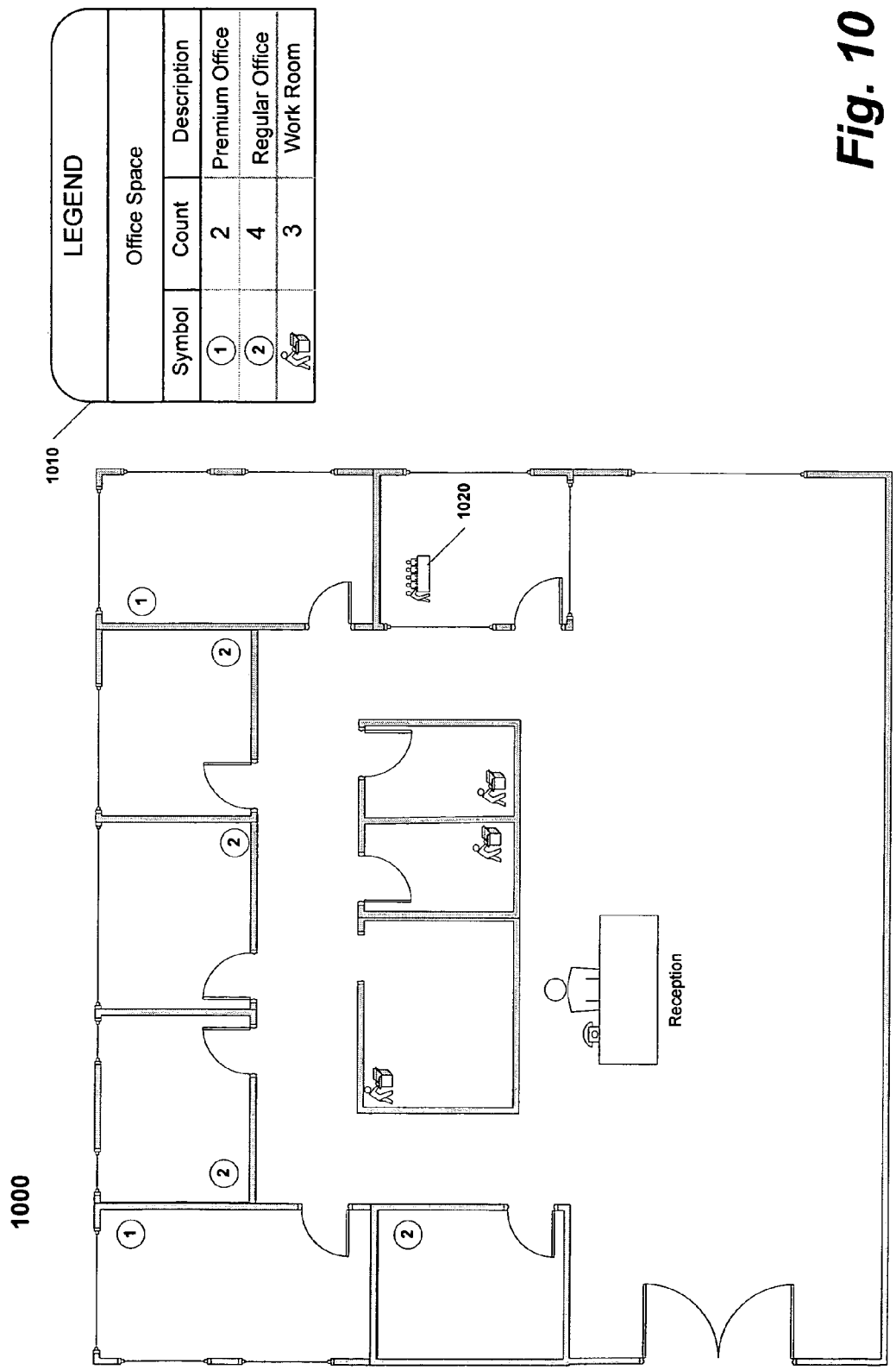
FIG. 10 is an image depicting a legend when a symbol is added to an electronic document where the symbol is not dynamically-linked to the legend in accordance with an exemplary embodiment of the present invention.

FIG. 10 is an image 1000 depicting a legend 1010 when a symbol 1020 is added to a drawing sheet 215 where the symbol is not dynamically-linked to the legend 1010 in accordance with an exemplary embodiment of the present invention. Referring to FIGS. 2, 9, and 10, image 1000 depicts an image similar to image 900. However, symbol 1020 has been added, perhaps to indicate that a conference room is included on the floor plan of image 1000. In this example, however, the symbol 1020 is not a legend symbol and has not been converted into a legend symbol. As such, its presence on the drawing sheet 215 is not indicated in legend 1010.

In accordance with an exemplary embodiment of the present invention, the symbol 1020 could be converted to a legend symbol after it has been included on the drawing sheet 215 depicted in image 1000. Following this conversion, the symbol 1020 would be added to the legend 1010 and the number of occurrences of the symbol 1020, one in the image 1000, would be presented in the column labeled "Count" in the legend 1010 and a description would be provided by a user, such as "Conference Room."

One skilled in the art would appreciate that the present invention supports a system and method for providing a dynamic legend for a drawing developed by a diagramming software program. The system may include a drawing sheet module and legend module, logically-coupled to the drawing sheet module, for generating and updating a dynamic legend. The method may include adding a legend to a drawing sheet and determining if legend symbols should be automatically added to the legend. The method also may include adding legend symbols to a drawing sheet and having that addition automatically reflected in the dynamic legend. Additionally, the method may provide for converting symbols to legend symbols such that they may be reflected in a dynamic legend.

What is claimed is:

1. A computer-implemented method for generating a dynamic legend for an electronic document, comprising the steps of:
    adding a legend to the electronic document;
    determining if the electronic document comprises at least one legend symbol; and
    if the at least one legend symbol is contained in the electronic document, adding each symbol to the legend.

2. The method of claim 1 further comprising the step of adding a data item to the legend for each symbol automatically added to the legend, wherein the data item comprises a count of occurrences of each symbol in the electronic document.

3. The method of claim 1 wherein the step of determining if the electronic document comprises at least one legend symbol comprises the steps of:
    determining for each symbol in the electronic document whether that symbol comprises a designation as a legend symbol; and identify each symbol in the electronic document that comprises a designation as a legend symbol.

4. The method of claim 3 wherein the step of determining for each symbol in the electronic document whether that symbol comprises a designation as a legend symbol comprises determining if a shape sheet corresponding to each symbol contains a designation that the symbol is a legend symbol.

5. The method of claim 1 wherein the step of adding each legend symbol to the legend comprises a graphical user interface displaying each legend symbol in the legend.

6. A computer-implemented method for updating a dynamic legend, comprising the steps of
   determining if a symbol placed in an electronic document comprises a legend symbol;
   if the symbol placed in the electronic document comprises a legend symbol, determining if a legend contains the symbol; and
   if the legend contains the symbol, increasing the value of a data item, wherein the data item corresponds to the number of occurrences of the symbol in the electronic document.

7. The method of claim 6 wherein the step of increasing the value of the data item comprises increasing the value by one unit.

8. The method of claim 6 further comprising the step of designating the symbol as a legend symbol if the symbol placed in the electronic document does not comprise a legend symbol.

9. The method of claim 6 further comprising the step of adding the symbol to the legend and increasing the value of the data item by one unit if the symbol placed in the electronic document comprises a legend symbol and if the legend does not contain the symbol.

10. The method of claim 9 wherein the step of adding the symbol to a set of designated legend symbols comprises adding information about the symbol.

11. The method of claim 6 wherein the step of determining if the symbol placed in an electronic document comprises a legend symbol comprises the step of determining if a shape sheet corresponding to each symbol contains a designation that the symbol is a legend symbol.

12. The method of claim 11 further comprising the step of displaying via a graphical user interface the information corresponding to one or more categories of information about each legend symbol in the legend.

13. The method of claim 6 further comprising the step of decreasing the value of the data item when an occurrence of the symbol is removed from the electronic document.

14. A computer-readable storage device storing a set of computer-executable instructions implementing a method of generating a dynamic legend for an electronic document, the method comprising the steps of:
   adding a legend to the electronic document;
   determining if the electronic document comprises at least one legend symbol; and
   if one or more legend symbols are contained in the electronic document, adding each legend symbol for presentation by the legend.

15. The computer-readable storage device of claim 14 further comprising the step of adding a data item to the legend for each symbol automatically added to the legend, wherein the data item comprises a count of occurrences of each symbol in the electronic document.

16. The computer-readable storage device of claim 14 wherein the step of determining if the electronic document comprises at least one legend symbol comprises the steps of:
   determining for each symbol in the electronic document whether that symbol comprises a designation as a legend symbol; and
   identify each symbol in the electronic document that comprises a designation as a legend symbol.

17. The computer-readable storage device of claim 14 wherein the step of adding each legend symbol to the legend comprises displaying each legend symbol in the legend via a graphical user interface.

18. The computer-readable storage device storing a set of computer-executable instructions implementing a method for updating a dynamic legend, comprising the steps of
   determining if a symbol placed in an electronic document comprises a legend symbol;
   if the symbol placed in the electronic document comprises a legend symbol, determining if a legend contains the symbol; and
   if the legend contains the symbol, increasing the value of a data item, wherein the data item corresponds to the number of occurrences of the symbol in the electronic document.

19. The computer-readable storage device of claim 18 wherein the step of increasing the value of the data item comprises increasing the value by one unit.

20. The computer-readable storage device of claim 18 further comprising the step of designating the symbol as a legend symbol if the symbol placed in the electronic document does not comprise a legend symbol.

21. The computer-readable storage device of claim 18 further comprising the step of adding the symbol to the legend and increasing the value of the data item by one unit if the symbol placed in the electronic document comprises a legend symbol and if the legend does not contain the symbol.

22. The computer-readable storage device of claim 21 wherein the step of adding the symbol to a set of designated legend symbols comprises adding information about the symbol.

23. The computer-readable storage device of claim 18 wherein the step of determining if a symbol placed in an electronic document comprises a legend symbol comprises the step of comparing the symbol in the electronic document to a set of designated legend symbols.

24. The computer-readable storage device of claim 23 wherein the set of designated legend symbols comprises information about each legend symbol and the step of adding each legend symbol to the legend comprises adding the information to the legend.

25. The computer-readable storage device of claim 24 further comprising the step of displaying the information corresponding to at least one category of information about each legend symbol in the legend via a graphical user interface.

26. The computer-readable storage device of claim 18 further comprising the step of decreasing the value of the data item when an occurrence of the symbol is removed from the electronic document.

* * * * *